(12) United States Patent
Galindo

(10) Patent No.: US 11,977,930 B2
(45) Date of Patent: *May 7, 2024

(54) DISTRIBUTED COMPUTER SYSTEM USING CORRECTNESS PROOF FOR PARTIAL EVALUATIONS IN DETERMINING CONSENSUS

(71) Applicant: UVUE LTD, Bury St Edmunds (GB)

(72) Inventor: David Galindo, Cambridge (GB)

( * ) Notice: Subject to any disclaimer, the term of this patent is extended or adjusted under 35 U.S.C. 154(b) by 379 days.

This patent is subject to a terminal disclaimer.

(21) Appl. No.: 17/400,465

(22) Filed: Aug. 12, 2021

(65) Prior Publication Data

US 2022/0075668 A1 Mar. 10, 2022

(30) Foreign Application Priority Data

Aug. 12, 2020 (EP) ..................................... 20020369

(51) Int. Cl.
*G06F 9/50* (2006.01)

(52) U.S. Cl.
CPC .................. *G06F 9/5088* (2013.01)

(58) Field of Classification Search
None
See application file for complete search history.

(56) References Cited

U.S. PATENT DOCUMENTS

| 10,630,477 | B1 | 4/2020 | Ju et al. |
| 2021/0377050 | A1 | 12/2021 | Wright |
| 2023/0013158 | A1 | 1/2023 | Wright |

FOREIGN PATENT DOCUMENTS

| CN | 109120398 A | 1/2019 |
| EP | 3540628 A1 | 9/2019 |
| KR | 20200035280 A | 4/2020 |
| WO | 2018203186 A1 | 11/2018 |
| WO | 2019034951 A1 | 2/2019 |
| WO | 2019116157 A1 | 6/2019 |
| WO | 2019142075 A1 | 7/2019 |
| WO | 2019193452 A1 | 10/2019 |

OTHER PUBLICATIONS

Freedman et al., "Efficient Set Intersection with Simulation-Based Security", Journal of Cryptology 29, p. 115-155, 2016 (Year: 2016).*
Extended European Search Report issued in EP Application No. EP20020369.3 on Jan. 29, 2021, 11 pages.
Pedersen, Torben Pryds—J. Feigenbaum (Ed.), published "Non-Interactive and Information-Theoretic Secure Verifiable Secret Sharing" in Advances in Cryptology—CRYPTO '91 on Jan. 1, 1992, vol. 576, pp. 129-140.
Notice of Allowance issued for U.S. Appl. No. 17/430,979, on Jul. 25, 2023, 22 Pages.

* cited by examiner

*Primary Examiner* — Eric C Wai
(74) *Attorney, Agent, or Firm* — RC Trademark Company

(57) ABSTRACT

There is provided a distributed computation system that establishes a consensus related to a computational value of a computational task, wherein the distributed computation system includes a plurality of computing nodes.

11 Claims, 2 Drawing Sheets

DISTRIBUTED COMPUTER SYSTEM USING CORRECTNESS PROOF FOR PARTIAL EVALUATIONS IN DETERMINING CONSENSUS

TECHNICAL FIELD

The present disclosure relates generally to distributed computation systems; moreover, the present disclosure relates to methods of (namely, methods for) operating the distributed computation system to solve given computational tasks, for example a computation task associated with data representative of real physical quantities representative of a real physical environment, but not limited thereto; more specifically, the present disclosure relates to systems and methods of establishing a consensus related to a solution of a computational task.

BACKGROUND

With advancements in technology, computing systems can now perform multitudes of computational tasks with increasing efficiency. The computing systems employ several resources, such as processing units, network arrangements, to perform the computational tasks. Furthermore, the computing systems potentially require additional resources for successfully performing the computational tasks. Additionally, the computing systems beneficially employ a distributed architecture to procure external assistance (namely, services, solutions and the like) from resources at remote locations. However, the resources at remote locations are not always reliable. Therefore, there is a need to establish consensus associated with the assistance provided by the resources.

Existing techniques for establishing consensus in a given computing system follow either interactive or non-interactive approaches. Interactive approaches require participants of the given computing system to interact with the resources. However, such interactions among participants and the resources are time consuming. In addition, on many occasions, a channel used for interaction among the participants and the resources are prone to cyberattacks. Moreover, communicating proofs among the participants and the resources consumes network bandwidth. In addition, interaction among the participants and the resources to establish consensus entails a high processing overhead. Such a high processing overhead and an issue of vulnerability of computing systems to cyberattacks by malicious third parties are technical problems encountered in known art.

Therefore, in light of the foregoing discussion, there exists a need to overcome the aforementioned drawbacks associated with several existing techniques for establishing consensus within a computing system.

SUMMARY

The present disclosure seeks to provides an improved distributed computational system that utilizes less computing overhead when establishing a consensus and is more resilient against third party malicious attacks. Moreover, the present disclosure seeks to provide an improved distributed computation system that establishes consensus related to a computational value of a computational task, wherein the distributed computation system includes a plurality of computing nodes. The system employs a non-interactive approach for establishing a consensus within the system; such a consensus is important for stable operation of the system, for example when different parts of the system are functioning in an asynchronous or pseudo-asynchronous manner; it will be appreciated that unstable operation of the system potentially leaves the system vulnerable to malicious third party attacks. Thus, the present disclosure seeks to improve how a distributed computer network functions in terms of reliability and robustness, speed, security when establishing consensus related to a solution of the computational task.

The present disclosure also seeks to provide an improved method of (namely a method for) operating a distributed computation system that establishes a consensus related to a computational value of a computational task, wherein the distributed computational system includes a plurality of computing nodes that function, for example, in an asynchronous manner or pseudo-asynchronous manner; by "pseudo-asynchronous" means, for example, that certain portions of the computing nodes function in a synchronous manner; optionally, other portions of the computing nodes function in an asynchronous manner. The method disclosed herein utilizes a non-interactive approach to establish the consensus. Notably, the method disclosed herein requires less time to establish the consensus, because the plurality of computing nodes do not need to interact; such rapidity to establish the consensus renders the computing nodes more stable when in operation and also potentially more temporally responsive. In addition, beneficially, such a non-interactive approach of establishing the consensus brings improved security by eliminating use of an unsecured channel for communication among the plurality of computing nodes.

An aim of the present disclosure is to provide a solution that overcomes, at least partially, the problems encountered in prior art, and provides a seamless, more secure, faster and more efficient approach for establishing a consensus within a distributed computation system.

In one aspect, the present disclosure provides a distributed computation system that establishes a consensus related to a computational value of a computational task, wherein the distributed computation system includes a plurality of computing nodes that are mutually coupled together via a data communication arrangement to exchange data therebetween, characterized in that:

the distributed computation system distributes the computational task to the plurality of computing nodes;

each of a first set of computing nodes, from the plurality of computing nodes, performs a partial evaluation of the computational task, wherein the first set of computing nodes store the partial evaluations of the computational task in a ledger arrangement associated with the plurality of computing nodes;

each of a second set of computing nodes from the plurality of computing nodes generate a computational value corresponding to each of the partial evaluations stored in the ledger arrangement and determine a correctness proof of each of the computational value; and a third set of computing nodes from the plurality of computing nodes validates the correctness proof of each of the computational values to establish the consensus related to the computational values.

In another aspect, an embodiment of the present disclosure provides a method of (namely, a method for) operating a distributed computation system that establishes a consensus related to a computational value of a computational task, wherein the distributed computing system includes a plurality of computing nodes that are mutually coupled together via a data communication arrangement to exchange data therebetween, characterized in that the method includes:

distributing the computational task to the plurality of computing nodes;

performing a partial evaluation of the computational task by each of a first set of computing nodes, from the plurality of computing nodes, wherein the first set of computing nodes store the partial evaluations of the computing task in a ledger arrangement associated with the plurality of computing nodes;

generating a computational value corresponding to each of the partial evaluations stored in the ledger arrangement and determining a correctness proof of each of the computational value using each of a second set of computing nodes from the plurality of computing nodes; and validating the correctness proof of each of the computational value to establish a consensus related to the computational values using a third set of computing nodes from the plurality of computing nodes.

The present invention is of advantage in that it eliminates, or at least partially addresses, the aforementioned problems in the prior art, and provides a more reliable, faster and more robust approach of establishing a consensus, related to a solution of a computational task, within the system. Moreover, the present disclosure is of advantage in that it provides a more secure, more efficient, more effective and more robust approach using a distributed computation system for solving computational tasks within a distributed economy or distributed resource control system, for example in a manufacturing environment.

Embodiments of the present disclosure utilize non-interactive zero-knowledge proofs of equality of discrete logarithms to test that the partial computations of pseudo-random values provided by computing nodes (namely, peers) coupled together via a data communication network are indeed correct. Once a given computing nodes (namely, peer) is convinced about the validity of these partial pseudo-random values, and if the minimum number (threshold) of computing nodes (namely, peers) have provided theft output, a full pseudo-random value can be computed with no further peer interaction, together with a proof of authenticity. A resulting full pseudorandom value can be verified by any third-party on inputs that value the corresponding proof.

Conventionally, distributed computation systems employ intrinsic operations of underlying mathematical objects to perform verification checks (e.g. bilinear pairings). These verification checks are typically more computationally demanding than employing non-interactive proofs as utilized in embodiments of the present disclosure; the present invention therefore provides a considerable advantage with respect to running time efficiency. Furthermore, verification checks employed in embodiments of the present disclosure are more secure than conventional approaches to providing verification in a distributed computation system.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
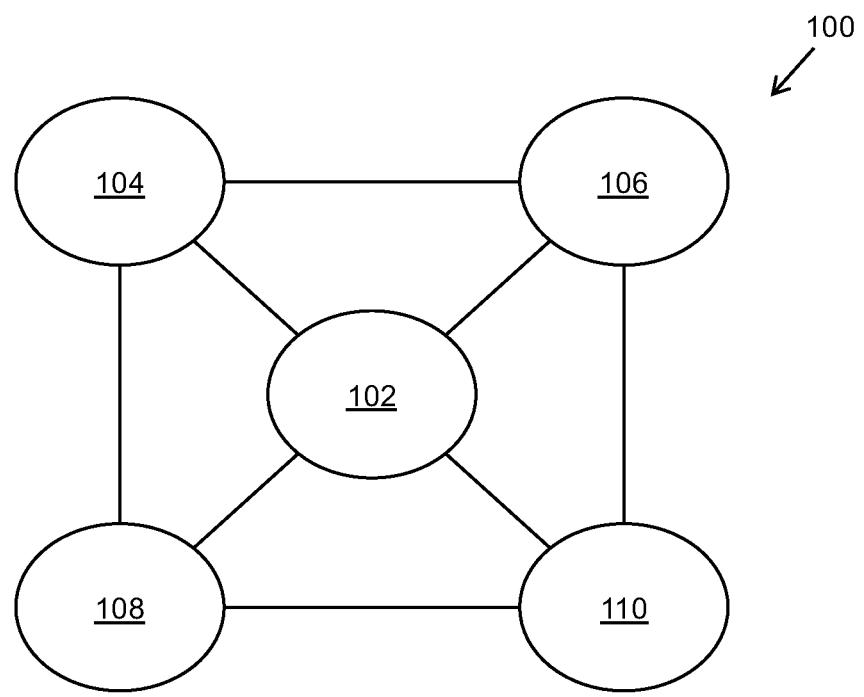
FIG. 1 is an illustration of a distributed computation system, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, there is provided a distributed computation system that establishes consensus related to a computational value of a computational task, wherein the distributed computation system includes a plurality of computing nodes that are mutually coupled together via a data communication arrangement to exchange data therebetween, characterized in that:

the distributed computation system distributes the computational task to the plurality of computing nodes;

each of a first set of computing nodes, from the plurality of computing nodes, performs a partial evaluation of the computational task, wherein the first set of computing nodes store the partial evaluations of the computational task in a ledger arrangement associated with the plurality of computing nodes;

each of a second set of computing nodes from the plurality of computing nodes generates a computational value corresponding to each of the partial evaluations stored in the ledger arrangement and determines a correctness proof of each of the computational value; and a third set of computing nodes from the plurality of computing nodes validates the correctness proof of each of the computational values to establish consensus related to the computational values.

In another aspect, there is provided a method of (namely, a method for) operating a distributed computation system that establishes a consensus related to a computational value of a computational task, wherein the distributed computing system includes a plurality of computing nodes that are mutually coupled together via a data communication arrangement to exchange data therebetween, characterized in that the method includes:
- distributing the computational task to the plurality of computing nodes;
- performing a partial evaluation of the computational task by each of a first set of computing nodes, from the plurality of computing nodes, wherein the first set of computing nodes stores the partial evaluations of the computing task in a ledger arrangement associated with the plurality of computing nodes;
- generating a computational value corresponding to each of the partial evaluations stored in the ledger arrangement and determining a correctness proof of each of the computational values using each of a second set of computing nodes from the plurality of computing nodes; and
- validating the correctness proof of each of the computational values to establish consensus related to the computational values using a third set of computing nodes from the plurality of computing nodes.

The present disclosure provides a solution to a technical problem of establishing a consensus regarding a computational value of computational task within a distributed computation system. Furthermore, the distributed computational system includes a plurality of computing nodes for carrying out different operations within the system. The distributed computation system establishes a consensus related to a computational value determined as a solution of the computational task. The system employs a non-interactive approach that results in a secured, faster and time efficient solution of the computational task. Such a correctness proof of the computational value has a reduced data size that consumes a lower network bandwidth while being communicated and associated reduced energy dissipation within the computation system. Furthermore, the distributed nature of the system improves a reliability, an availability and a responsiveness of the computation system. In addition, the distributed computation system is more robust and has, for example, a substantially reduced downtime. In addition, the system and method proposed herein are susceptible to being implemented using conventional hardware devices whose technical operation is implemented pursuant to the present disclosure; embodiments of the present disclosure cause the conventional hardware devices mutually to interact in a novel manner that improves their technical performance, as aforementioned. Alternatively, embodiments of the present disclosure utilize custom digital hardware controlled via use of customized software products; such custom digital hardware optionally includes field programmable gate arrays (FPGA's) and similar.

The distributed computation system as disclosed herein relates to a system that, when in operation, establishes a consensus for correctness of work done for solving a computational task. Beneficially, the distributed (namely, decentralized) nature of the distributed computation system substantially reduces an overall downtime of the distributed computation system when in operation. The distributed computation system includes the plurality of computing nodes, wherein the plurality of computing nodes carries out a plurality of operations such as a mathematical operation, a Boolean operation, a logical operation, a decision-making operation and so forth within the system for solving the computational task. The computational task as used herein relates to a mathematical operation, a puzzle, a Boolean operation, a logical operation, a decision-making operation and the like. Notably, the computational task is optionally a pseudorandom function (namely, a PRF) that is evaluated and solved by utilizing the plurality of computing nodes that are mutually distrustful in nature.

Furthermore, the pseudorandom function is an efficient, deterministic function (namely, computable in polynomial time) that maps two distinct sets (namely, domain and range) and behaves as a truly random function. The pseudorandom function used in the system is a distributed verifiable random function (namely, DVRF), wherein publicly verifiable proofs of correctness of its output are used to validate work done by the plurality of computing nodes. An aim of a distributed verifiable random function is to compute, in a spatially distributed manner, a pseudorandom
- function fsk(x) for a given input x, wherein sk is a secret key that is not
- explicitly available to any computing node. Moreover, a public key pk corresponding to the secret key sk is collectively computed by the plurality of computing nodes. Beneficially, a verifiability of work done by a plurality of computing nodes increases reliability and security of operation of the distributed computation system. It will be appreciated that system reliability and system security are both technical effects provided by embodiments of the present disclosure.

The term "the plurality of computing nodes" relates to computational elements that are operable to respond to, and processes, instructions that drive the distributed computation system. Optionally, the plurality of computing nodes includes, but are not limited to, a microprocessor, a microcontroller, a complex instruction set computing (CISC) microprocessor, an application-specific integrated circuit (ASIC), a field programmable gate array (FPGA), a configuration of customized logic devices, a reduced instruction set (RISC) microprocessor, a very long instruction word (VLIW) microprocessor, an artificial intelligence (AI) computing engine based on hierarchical networks of variable-state machines, or any other type of processing circuit. Furthermore, the plurality of computing nodes can be one or more individual processors, processing devices and various elements associated with a processing device that may be shared by other processing devices. Additionally, the plurality of computing nodes, processing devices and elements are arranged in various architectures for responding to and processing the instructions that drive the system. Beneficially, such arrangement of the plurality if computing nodes provides adaptability and flexibility to the distributed computing system.

Moreover, the plurality of computing nodes is beneficially communicably coupled to each other via a data communication network. The data communication network allows for communication among the plurality of computing nodes. In other words, each of the plurality of computing nodes are capable of communicating with other computing nodes via the data communication network. Notably, the data communication network relates to an arrangement of interconnected, programmable and/or non-programmable components that, when in operation, facilitate data communication between one or more electronic devices and/or databases. Furthermore, the data communication network includes, but is not limited to, a peer-to-peer (P2P) network, ring communication networks, a hybrid peer-to-peer network, local area networks (LANs), radio access networks (RANs), metropolitan area networks (MANs), wide area networks (WANs), all of or a portion of a public network such as global computer network known as the Internet®, a private network, a cellular network and any other communication system.

Additionally, optionally, the data communication network employs wired or wireless communication that can be carried out via one or more known protocols, including, but not limited to, Internet Protocol (IP), Wireless Access Protocol (WAP), Frame Relay, or Asynchronous Transfer Mode (ATM), Bluetooth® an such like. Moreover, any other suitable protocols using voice, video, data, or combinations thereof, can also be employed, for example VoIP.

In an example embodiment, the data communication network is implemented as a distributed peer-to-peer (P2P) network of interconnected plurality of computing nodes.

Optionally, the plurality of computing nodes participates in an interactive distributed key generation. The plurality of computing nodes participates in an interactive distributed key generation protocol, wherein each of the plurality of computing nodes interacts with other computing nodes using a confidential and authenticated communication channel. Beneficially, use of confidential and authenticated communication channel provides an enhanced security to the distributed computation system. In addition, such use of the confidential and authenticated channel prevents communication among the plurality of computing nodes from attacks by malicious and fraudulent elements, for example malicious third parties, trying to attack the data communication network.

In a first embodiment of the present disclosure, C is a set of computing nodes, wherein $C=\{P_1, \ldots, PN\}$, wherein N is number of computing nodes in the set C. Furthermore, at most $2 \leq t \leq N$ computing nodes from the set C are dishonest, which implies that at least $2 \leq t+1 \leq N$ computing nodes perform computational tasks in a correct manner using authentic means. Notably, t is referred as a threshold value, wherein at least $t+1$ computing nodes from the set C successfully complete the interactive distributed key generation protocol. Subsequently, the output of the interactive distributed key generation protocol is a public key pk, a vector of at most N verification keys $(vk_1, =gx_1, \ldots, vk_N, =g \times N)$ and at most N secret keys $(X_1, \ldots, X_N)$, wherein at least $t+1$ keys have been successfully computed. Moreover, a secret key $X_i$ is known only to correspond to a computing node $P_i$.

Optionally, the plurality of computing nodes participates in Non-Interactive and Information-Theoretic Secure Verifiable Secret Sharing. Beneficially, Non-Interactive and Information-Theoretic Secure Verifiable Secret Sharing enables sharing of data between two or more parties lacking mutual trust. A leader from the plurality of computing nodes is selected that facilitates sharing of secret data. The Non-Interactive and Information-Theoretic Secure Verifiable Secret Sharing is implemented over a cryptographically secure elliptic curve group (G, g, q), wherein G denotes the elliptic curve group, g denotes a generator of the elliptic curve group, and q denotes a prime that divides the order of the elliptic curve group G. Moreover, Elliptical curve cryptography (ECC) is a public key cryptographic technique that is used to create faster, smaller, and more efficient cryptographic primitives. Consequently, by employing such Elliptical curve cryptography (ECC), the plurality of computing nodes establishes a secured channel for communication therebetween.

Beneficially, use of Interactive and Information-Theoretic Secure Verifiable Secret Sharing technique eliminates a need for verification and mutual trust among the plurality of computing nodes.

Moreover, as aforementioned, the computing nodes evaluate and solve the computational task. Subsequently, the computing nodes provide the computational value of the computational task, wherein the computational value of the computational task relates to an output (namely, a solution, a result) obtained by solving the computational task. The distributed computing system establishes a consensus related to the computational value of the computational task. The consensus related to the computational value of the computational task refers to an agreement within the distributed computational system regarding a truthfulness and correctness of the computational value of the computational task. Furthermore, the distributed computation system distributes the computational task to the plurality of computing nodes.

Optionally, the computational task is distributed to specific computing nodes selected from the plurality of computing nodes. Alternatively, optionally, computing nodes from the plurality of computing nodes opt themselves whether or not to receive the computational task.

It will be appreciated that computing nodes from the plurality of computing nodes that partially evaluate the computational task form the first set of computing nodes. The first set of computing nodes includes at least one of the pluralities of computing nodes. Moreover, each of the first set of computing nodes performs the partial evaluation of the computational task. Each of the computing nodes in the plurality of computing nodes that have received the computational task perform operations (such as a mathematical process, a Boolean process and the like) and/or an analysis on the computational task. Notably, each of the computing nodes in the first set of computing nodes generates a partial evaluation of the computational task. Consequently, the first set of computing nodes generate partial evaluations of the computational task equal to a number of computing nodes in the first set of computing nodes. Beneficially, solving the computational task partially reduces a time period required to solve the computational task as the computational value is computed using the partial evaluations generated by the first set of computing nodes.

Optionally, the partial evaluation of the computational task includes one or more operations to be performed to solve the computational task.

Optionally, the first set of computing nodes perform the partial evaluation of the computational task using a partial evaluation algorithm. Referring to the first embodiment, given a plaintext input x, at least $t+1$ computing nodes from the set C perform a partial pseudorandom function computation. PartialEval($sk_i$, $vk_i$, x) is a partial evaluation algorithm that takes as input server $S_i$, a secret key $sk_i$ and a verification key $vk_i$, and a plaintext input x. The partial evaluation algorithm PartialEval($sk_i$, $vk_i$, x) outputs a triple (i, f'sk(x), $n^i x$):=$s^i x$, where f'sk(x) is an i-th partial evaluation share and $n^i x$ is a non-interactive proof of a correct partial evaluation. The partial evaluation is defined as follows: PartialEval($sk_i$, $vk_i$, x) outputs (i, f'sk(x), $n^i x$):=$s^i x$, for a plaintext $x \in \{0, 1\}$ a(k), where f'sk(x)←$H_1(x)^{sk_i}$, and $n^i x$←PrEqH2(g, $vk_i$, $H_1(x)$, f'sk(x); r) for randomness $rR \leftarrow Z_q$, where $H_1: \{0, 1\}^* \to G$ and $H_2: \{0, 1\}^* \to Z_q$ are hash functions, G is cryptographically secure elliptic curve group and EqD|H(g1, g2, y1, y2)=(PrEqH, VerifyEqH) for g1, g2, y1, y2∈G is a Chaum-Pedersen non-interactive zero-knowledge proof system for equality of discrete logarithms. The zero-knowledge proof system discloses a method by which one party (a prover) proves to another party (a verifier) that they know a value x, without conveying any information apart from a fact that they know the value x. An essence of zero-knowledge proofs is that it is trivial to prove that one proves possession of an information without revealing the information itself or any additional information.

Consequently, the first set of computing nodes generate partial evaluations of the computational task equal to a number of computing nodes in the first set of computing nodes. Notably, such generation of partial evaluations does not require any interaction among the plurality of computing nodes. Therefore, such generation of partial evaluations requires less computational time, less communication bandwidth used, and less energy dissipated, and is secured as no insecure channel for communication is used.

Furthermore, the first set of computing nodes store the partial evaluations of the computational task in the distributed ledger arrangement associated with the plurality of computing nodes. The distributed ledger arrangement is implemented as a distributed database. Such a distributed ledger arrangement optionally exists as a plurality of copies thereof on computing nodes within the system that are optionally arranged at mutually different geographical locations. Such a distributed ledger arrangement is optionally implemented using a public and non-permissioned ledger. The partial evaluations stored in the distributed ledger arrangement are available to the plurality of computing nodes. Beneficially, storing the partial evaluations of the computational task increases an ease of access and availability of the partial computations by the plurality of computing nodes. In addition, the computing nodes access the partial evaluations directly from the distributed ledger arrangement, thereby reducing time required for accessing the partial evaluations; such a manner of operation renders the distributed computation system more temporally responsive.

Optionally, the first set of computing nodes store the partial evaluations in a single block on the distributed ledger arrangement. Alternatively, optionally, each of the first set of plurality of computing nodes store the partial evaluations on different blocks on the distributed ledger arrangement. Additionally, optionally, each of the blocks in the ledger distributed arrangement is connected to a previous block within the ledger arrangement. Notably, storing the partial evaluations in blocks enables the plurality of computing nodes to access the partial evaluations randomly.

Furthermore, computing nodes from the plurality of computing nodes that access the partial evaluations stored in the distributed ledger arrangement and further solve the partial evaluations of the computational task form the second set of computing nodes. Notably, each of a second set of computing nodes from the plurality of computing nodes generate the computational value corresponding to each of the partial evaluations stored in the ledger arrangement and determine the correctness proof of each of the computational value. The second set of computing nodes includes at least one of the plurality of computing nodes. The computational value corresponding to each of the partial evaluations are tentative final solutions of the computational tasks. In addition, each of the computational value has a correctness proof associated therewith. The correctness proof associated with the computational value provides an evidence of work done (such as electricity, memory and processing power consumed) to generate the computational value. Beneficially, computational values generated by each of the computing nodes from the second set of computing nodes provide the computation system with multiple solutions to the computational task, wherein the computation system is enabled to pick one or more correct and suitable computational values as a final solution to the computational task. The correctness proof provided by the second set of computing nodes eliminates a need to communicate with other computing nodes for validating the computational values generated by the second set of computing nodes; such an elimination of a need to communicate reduces data communication workload arising in operation within the computation system.

Optionally, the second set of computing nodes generates the computational value and the correctness proof using a recovery algorithm. An execution of the recovery algorithm does not require any interaction among the plurality of computing nodes. Notably, in an example where at least t+1 partial evaluations of the pseudorandom function $f_{sk}(x)$ are stored in the distributed ledger arrangement (namely, a bulletin board), the second set of computing nodes runs the recovery algorithm. Recovery (pk, vk, x, S) is a combination algorithm that takes as input the public key pk, the plaintext x and a list $S=\{s_x^i1, \ldots, s_x^i|s|\}$ of partial evaluations originating from ISI t+1 different computing nodes together with verification keys $vk_1$, $vk_j$, and outputs either a pair (v, n) of computational value v and correctness proof n, or reject, wherein value of v is set to ⊥ (namely, unconditionally false) when the output is reject. Notably, output of the recovery algorithm is rejected, if vkj=∅ and S contains a share with index j.

Furthermore, the distributed computation system includes a protocol variant comprising a correctness proof (or a compact proof) for distributed randomness computation. The distributed computation system is implemented for an elliptical curve group (G) such that there exists two or more subgroups such as a subgroup (G2) of a different elliptical curve and a subgroup (G3) of a finite field, and an efficiently computable pairing function:

$$e: G \times G_2 \to G_3.$$

Notably, the plurality of computing nodes of the distributed computing system performing the generation, storing of the partial evaluation, perform the same operation in the protocol variant of the distributed computing system. In an example, at least t+1 partial evaluations of the pseudorandom function $f_{sk}(x)$ are generated and stored in the distributed ledger arrangement. Notably, the pseudorandom function $f_{sk}(x)$ for a given input x, wherein sk refers to a secret key that is not explicitly available to any computing node of the plurality of computing nodes. Moreover, a public key (pk) corresponding to the secret key (sk) is collectively computed by the plurality of computing nodes. Beneficially, a verifiability of work done by a plurality of computing nodes increases reliability and security of operation of the protocol variant of the distributed computation system.

The different set (for example, second set) of computing nodes of the plurality of computing nodes is configured to generate the computational value and the correctness proof (or the compact proof) using a recovery algorithm. The recovery algorithm denoted as Recovery (pk, vk, x, S) takes as an input the public key (pk), the plaintext (x) and a list of partial evaluations $S=\{s_x^i1, s_x^i2, \ldots, s_x^i|s-1|, s_x^i|s|\}$ originating from different computing nodes, wherein |S|≥t+1. Further, the recovery algorithm includes verification keys $vk_{j1}$, $vk_{j2}$, . . . , $vk_{j|S|}$ and presents as an output a pair (v, n) of computational value v and correctness proof n, or reject, or accept.

The recovery algorithm: Recovery (pk, vk, x, S) comprises parsing a list $S=\{s_x^i1, s_x^i2 \ldots s_x^i|s|\}$ of partial evaluations originating from |S| different computing nodes of the plurality of computing nodes and obtains the verification keys $vk_{j1}$, $vk_{j2}$, . . . , $vk_{j|S|}$.

In operation, the recovery algorithm Recovery (pk, vk, x, S):

1. identifies an index subset $I=\{i_1, i_2, \ldots, i_{t+1}\}$, wherein every i∈I.

Moreover, for every i∈I the following verification function:

VerifyEq$_{H2}$(g, vk$_i$, H$_1$(x), f$^i_{sk}$(x), Π$^i_x$)=accept holds true, wherein (i, f$^i_{sk}$(x), Π$^i_x$)←s$^i_x$.

Further, if no such subset exists or is identified by the recovery algorithm, the output of the recovery algorithm is 'reject'.

Furthermore, the recovery algorithm:

2. sets Π←Π$_{j∈I}$ (f$_{sk}^j$(x))$^{\lambda^I_j}$ with I={i$_1$, . . . , i$_{t+1}$}, and wherein $\lambda^I_j$'s refers to the Lagrange coefficients given by:

$$\lambda^I_j = \prod_{k \in I \setminus \{j\}} \frac{k}{k-j} \in Z_q^{*1}.$$

Furthermore, the recovery algorithm:

3. sets v←H$_3$(Π), wherein H$_3$ is a secure hash function, such as SHA-3.

The SHA-3 is a member of the secure hash algorithm (SHA) family and a subset of the broader cryptographic primitive family Keccak based on a wide random function or random permutation, and allows inputting any amount of data, and outputting any amount of data, while acting as a pseudorandom function such as f$_{sk}$(x) with regard to all previous inputs providing a greater flexibility.

Furthermore, the recovery algorithm:

4. outputs a pair (v, n) of computational value (v) and correctness proof (Π).

Additionally, optionally, the recovery algorithm is defined as follows: Recovery (pk, vk, x, S) parses list S={s$_x^i$1, . . . , s$_x^i$|s|} of partial evaluations originating from |S| different computing nodes and obtains verification keys vkj1, . . . , vkj|S|. Furthermore, the recovery algorithm:

1. Identifies an index subset I={i$_1$, . . . , i$_{t+1}$} such that for every i∈I the following VerifyEqH2(g, vk$_i$, H$_1$(x), f$^i_{sk}$(x), Π$^i_x$)=accept holds, where (i, f$^i_{sk}$(x), Π$^i_x$)←s$^i_x$. If no such subset exists output of the recovery algorithm is 'reject'.

2. Sets $$v \leftarrow \prod_{j \in I} (f_{sk}^j(x))^{\lambda^I_j}$$

with I={i$_1$, . . . , i$_{t+1}$}, where $\lambda^I_j$'s are given by $$\lambda^I_j = \prod_{k \in I \setminus \{j\}} \frac{k}{k-j} \in Z_q^{*1}.$$

3. Sets Π←{s$^i_x$}i∈I
4. Outputs (v, n).

Furthermore, the third set of computing nodes from the plurality of computing nodes validates the correctness proof of each of the computational value to establish consensus related to the computational values. Notably, computing nodes from the plurality of computing nodes that evaluates the correctness proof of the computational value form the third set of computing nodes. The third set of computing nodes validate truthfulness and genuineness of the correctness proof. Consequently, a successful validation of the computational value proves a correct computational value (namely, a solution) of the computational task. Notably, validating the computational value using the correctness proof reduces a time required for validation thereof and enhances security of the system by eliminating use of unsafe communication channels; such a manner of operation is capable of increasing temporal responsiveness of the computation system when executing various data processing tasks.

Moreover, the different set (for example, the third set) of computing nodes of the plurality of computing nodes is configured to validate the output by the recovery algorithm (i.e. the computational value v of the pseudorandom function v=fsk(x)) by applying or implementing a verification algorithm.

The verification algorithm denoted as Verify (pk, vk, x, v, TT), wherein the verification algorithm Verify (pk, vk, x, v, TT) takes as input the public key (pk), verification key (vk), the plaintext (x), the computational value (v), and the correctness proof (Π) and presents an output as either accept or reject, wherein the accept output represents a validation of the computational value and the reject output represents an invalidation of the computational value.

In operation, the verification algorithm Verify (pk, vk, x, v, TT) checks or verifies whether the function: e(H$_1$(x), pk)=e(Π, g$_2$), wherein v=H$_3$(Π) and g$_2$ is an elliptic curve point that generates the subgroup G$_2$.

Furthermore, the different set (for example, the third set of computing nodes) from the plurality of computing nodes validates the compact proof of each of the computational value to establish consensus related to the computational values. Notably, the different computing nodes from the plurality of computing nodes configured to evaluate the correctness proof (or the compact proof) of the computational value form the third set of computing nodes. The third set of computing nodes validate truthfulness and genuineness of the correctness proof. Consequently, a successful validation of the computational value proves a correct computational value (namely, a solution) of the computational task. Notably, validating the computational value using the correctness proof (or the compact proof) reduces a time required for validation thereof and enhances security of the system by eliminating use of unsafe communication channels; such a manner of operation is capable of increasing temporal responsiveness of the computation system when executing various data processing tasks.

Beneficially, the protocol variant of the distributed computation system provides a proof (such as the compact proof) whose size is independent of the threshold (t), as opposed to conventional protocols and systems, wherein the size is a linear function with respect to the threshold (t).

Optionally, the third set of computing nodes verifies correctness of the computational value of each of the partial evaluations of the computational task using a verification algorithm. Notably, any of the plurality of computing nodes can validate the correctness proof by applying the verification algorithm.

Optionally, a third party computing node can validate the correctness proof by applying the algorithm.

Optionally, the third set of computing nodes validates a computational value of the pseudorandom function v=f$_{sk}$(x) by applying Verify (pk, vk, x, v, Π), wherein Verify (pk, vk, x, v, Π) is a verification algorithm that takes as input the public key pk, verification keys vk, the plaintext x, the computational value v, and the correctness proof n and outputs accept and reject, wherein accept output shows a validation of the computational value and reject output shows invalidation of the computational value.

Additionally, optionally, the verification algorithm is defined as follows: Verify (pk, vk, x, v, Π) parses Π={$s^i_x$} i∈I such that |I|=t+1 and further the algorithm:
1. Parses (i, $w^i$, $n^i$)←$s^i$ for i∈I
2. Checks that VerifyEqH2($g$, $vk_i$, $H_1(x)$, $w^i$, $n^i$)=accept for every i∈I; if some of the checks fail, outputs reject
3. Checks that $$v = \prod_{i \in I}(wj)^{\lambda^I_j}$$

if true outputs accept; otherwise outputs reject.

Optionally, the protocol variant of the distributed computation system is implemented as a distributed signature scheme (may also be referred to as an interactive distributed key generation protocol). In operation, the output of the distributed signature scheme (or the interactive distributed key generation protocol) is a public signing key (pk), a vector of at most N verification keys ($vk_1$, =$gx_1$, . . . , $vk_N$, =$gx_N$) and at most N secret signing keys ($X_1$, . . . , $X_N$), wherein the at least t+1 keys have been successfully computed. Moreover, the signing secret key ($X_i$) is known only to correspond to a computing node ($P_i$) of the plurality of computing nodes. The distributed signature scheme similar to the protocol variant of the distributed computing system comprising the correctness proof (or the compact proof) for distributed randomness computation further comprises a partial signing algorithm analogous to the partial evaluation algorithm of the protocol variant. The partial signing algorithm denoted as PartialSign($sk_i$, $vk_i$, x) is configured to sign the plaintext (x) (or document). Typically, the partial signing algorithm is run or implemented by the computing node ($P_i$) of the plurality of computing nodes. Moreover, the distributed signature scheme similar to the protocol variant of the distributed computing system comprises a signature recovery algorithm analogous to the recovery algorithm of the protocol variant. The signature recovery algorithm denoted as RecoverySignature(pk, vk, x, S) is configured to compute a complete signature σ on the plain text (x) from a set or list S={$s_x^i$1, . . . , $s_x^i$|S|} of partial signatures on the plain (x) originating from |S| different computing nodes (such as the third set of computing nodes). The list S of partial signatures is originated along with the corresponding verification keys $vk_{j1}$, $vk_{j2}$, . . . , $vk_{j|S|}$.

The different set (for example, the third set) of computing nodes of the plurality of computing nodes is configured to verify the list of partial signatures by applying or implementing a global signature verification algorithm.

The global signature verification algorithm denoted as Verify (pk, vk, x, v, Π) is configured to:
1. parse the signature σ as (v, Π), and
2. present as an output the result of implementing or running the verification algorithm Verify (pk, vk, x, v, Π), wherein Verify (pk, vk, x, v, Π) is the verification algorithm of the protocol variant of the distributed computation system.

The present disclosure also relates to the method as described above. Various embodiments and variants disclosed above apply mutatis mutandis to the method.

DETAILED DESCRIPTION OF THE DRAWINGS

Referring to FIG. 1, there is provided an illustration of a distributed computation system 100, in accordance with an embodiment of the present disclosure. When in operation, the distributed computation system 100 establishes a consensus related to a computational value of a computational task. Furthermore, the distributed computation system 100 includes a plurality of computing nodes (depicted as computing nodes 102, 104, 106, 108 and 110) that are mutually interconnected via a data communication network, wherein, when in operation, the distributed computation system 100 distributes the computational task to the plurality of computing nodes. Furthermore, each of a first set of computing nodes, from the plurality of computing nodes 102, 104, 106, 108 and 110, performs a partial evaluation of the computational task. The first set of computing nodes stores the partial evaluations of the computational task in a distributed ledger arrangement (not shown) associated with the plurality of computing nodes 102, 104, 106, 108 and 110. Moreover, each of a second set of computing nodes from the plurality of computing nodes 102, 104, 106, 108 and 110 generates a computational value corresponding to each of the partial evaluations stored in the ledger arrangement and determine a correctness proof of each of the computational values. Subsequently, a third set of computing nodes from the plurality of computing nodes 102, 104, 106, 108 and 110 validates the correctness proof of each of the computational values to establish consensus related to the computational values.

It will be appreciated by a person skilled in the art that FIG. 1 includes a simplified illustration of the distributed computation system 100 for sake of clarity only, which should not unduly limit the scope of the claims herein. The person skilled in the art will recognize many variations, alternatives, and modifications of embodiments of the present disclosure.

Figure 2:
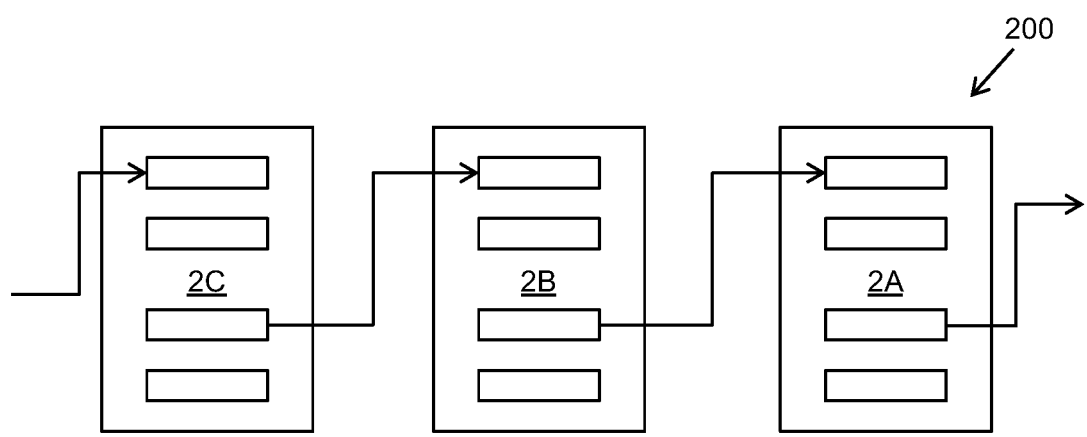
FIG. 2 is a schematic illustration of a ledger arrangement of the distributed computation system of FIG. 1.

Referring next to FIG. 2, there is provided a schematic illustration of a ledger arrangement 200 of the distributed computation system 100 of FIG. 1. As shown, the blocks 2A, 2B and 2C are blocks containing partial evaluations of a computational task. Furthermore, each block is connected to a previous block within the ledger arrangement, namely block 2C is connected to previous block 2B, and further the previous block 2B is connected to a yet previous block 2A.

It will be understood by a person skilled in the art that FIG. 2 is merely an example, which should not unduly limit the scope of the claims herein. The person skilled in the art will recognize many variations, alternatives, and modifications of embodiments of the present disclosure.

Figure 3:
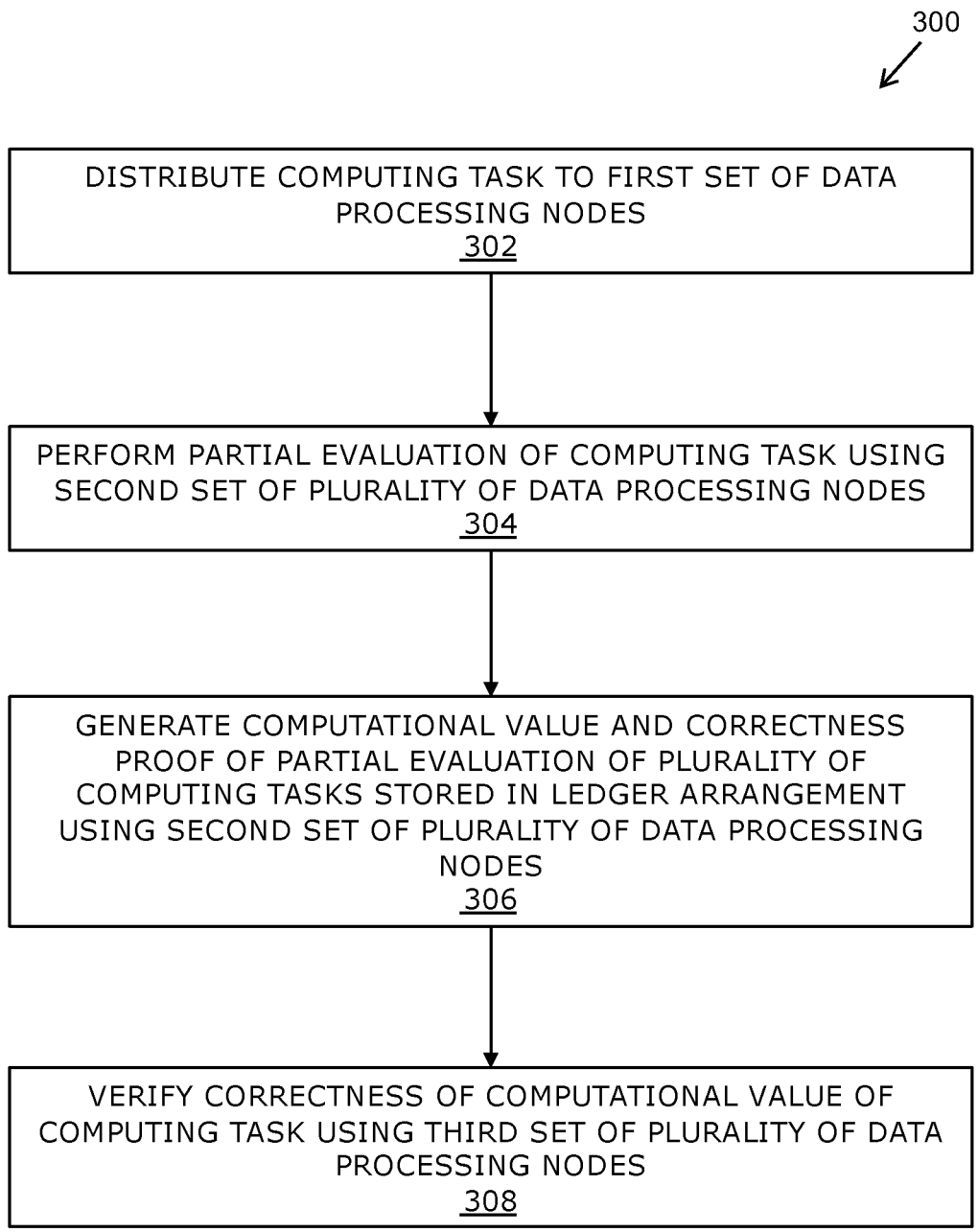
FIG. 3 is an illustration of steps of a method of operation of a distributed computation system, in accordance with an embodiment of the present disclosure.

Referring next to FIG. 3, there is provided an illustration of a flow chart of steps of a method 300 of (namely, a method for) operating a distributed computation system, according to an embodiment of the present disclosure; for example, the distributed computation system as implemented as described in the foregoing. In the method 300, the distributed computation system establishes a consensus related to a computational value of a computational task. The distributed computation system includes a plurality of computing nodes. At a step 302, the computational task is distributed to a first set of computing nodes from the plurality of computing nodes. At a step 304, a partial evaluation of the computational task is performed by each of the first set of computing nodes. Notably, the first set of computing nodes stores the partial evaluations of the computing task in a ledger arrangement associated with the plurality of computing nodes. Moreover, at a step 306, a computational value is generated corresponding to each of the partial evaluations stored in the ledger arrangement and a correctness proof of each of the computational value is determined using each of a second set of computing nodes from the plurality of computing nodes. At a step 308, the correctness proof of each of the computational value is validated to establish a consensus related to the computational values using a third set of computing nodes from the plurality of computing nodes.

The steps 302, 304, 306 and 308 are only illustrative and other alternatives can also be provided where one or more steps are added, one or more steps are removed, or one or more steps are provided in a different sequence without departing from the scope of the claims herein.

From the foregoing, it will be appreciated that embodiments of the present disclosure are capable of improving operation of a distributed computation system that includes a plurality of nodes, for example computing devices, hardware logic devices or similar. The embodiments are capable of improving technical performance, for example system responsiveness, system security, system energy dissipation, system operating bandwidth requirement and system operating stability (for example, when the nodes are functioning asynchronously or pseudo-synchronously. The system, when in operation, is capable of receiving input sensor signals from a physical environment, and providing output signals to the physical environment, wherein operations performed via use of the ledger determine how the output signals are generated in respect of the input signals. Embodiments of the present disclosure can be used, for example, in autonomous vehicle control, manufacturing processes, and robotics. Other practical uses of embodiments in the present disclosure are also feasible.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A distributed computation system that establishes a consensus related to a computational value of a computational task, wherein the distributed computation system includes a plurality of computing nodes that are mutually coupled together via a data communication arrangement to exchange data therebetween, wherein each of the plurality of computing nodes comprises at least one hardware processor, wherein:

the distributed computation system having plurality of computing nodes is configured to distribute the computational task to the plurality of computing nodes, wherein the distributed computation system includes a protocol variant as a means of allowing secure communication among the plurality of interconnected computer nodes, comprising a correctness proof for distributed randomness computation;

each of a first set of computing nodes, from the plurality of computing nodes, is configured to generate a partial evaluation of the computational task using a partial evaluation algorithm without any interaction among plurality of computing nodes, wherein the first set of computing nodes are configured to store the partial evaluations of the computational task in a ledger arrangement associated with the plurality of computing nodes;

each of a second set of computing nodes from the plurality of computing nodes is configured to generate a computational value corresponding to each of the partial evaluations stored in the ledger arrangement and to determine and store a correctness proof of each of the computational value using a recovery algorithm without any interaction among the plurality of computing nodes, wherein the recovery algorithm comprises verification keys for each of the correctness proofs, such that the correctness proof eliminates a need to communicate with other computing nodes for validating the computational values generated by the second set of computing nodes; and each of a third set of computing nodes from the plurality of computing nodes is configured to validate the correctness proof of each of the computational value to establish the consensus related to the computational values, wherein the third set of computing nodes is configured to validate the correctness proof using a verification algorithm that uses the verification key, the computational value and the correctness proof and provides output as either accept or reject, wherein the accept output represents a validation of the computational value and the reject output represents an invalidation of the computational value, thereby establishing consensus such that a time required for validation is reduced, and such that a use of unsafe communication channels is eliminated due to the non-interactivity of the plurality of computing nodes, and a temporal responsiveness of the computation system is increased when executing various data processing tasks.

2. The system of claim 1, wherein the plurality of computing nodes are configured to participate in an interactive distributed key generation, wherein each of the plurality of computing nodes is configured to interact with the other computing nodes using a confidential and authenticated communication channel.

3. The system of claim 1, wherein the partial evaluation algorithm is a partial pseudorandom function computation, wherein given a plaintext input x, the pseudorandom function utilizes a cryptographically secure elliptic curve and a non-interactive zero-knowledge proof system to test the correctness of the partial computation of pseudo-random values provided by computing nodes, without revealing the information itself or any additional information.

4. The system of claim 1, wherein the protocol variant of the distributed computation system is implemented as a distributed signature scheme to generate a public signing key to validate consensus, comprising a partial signing algorithm and a signature recovery algorithm used to compute a complete signature from a list of partial signatures.

5. The system of claim 1, wherein the third set of computing nodes are configured to verify a list of partial signatures by implementing a global signature verification algorithm.

6. A method for operating a distributed computation system that establishes a consensus related to a computational value of a computational task, wherein the distributed computing system includes a plurality of computing nodes that are mutually coupled together via a data communication arrangement to exchange data therebetween, wherein each of the plurality of computing nodes comprises at least one hardware processor, wherein the method includes:

distributing the computational task to the plurality of computing nodes, wherein the distributed computation system having plurality of computing nodes includes a protocol variant as a means of allowing secure communication among the plurality of interconnected computer nodes comprising a correctness proof for distributed randomness computation;

generating a partial evaluation of the computational task using a partial evaluation algorithm without any interaction among plurality of computing nodes by each of a first set of computing nodes, from the plurality of computing nodes, wherein the first set of computing nodes stores the partial evaluations of the computing task in a ledger arrangement associated with the plurality of computing nodes;

generating a computational value corresponding to each of the partial evaluations stored in the ledger arrangement and determining a correctness proof of each of the computational value using each of a second set of computing nodes from the plurality of computing nodes using a recovery algorithm without any interaction among the plurality of computing nodes, wherein the recovery algorithm comprises verification keys for each of the correctness proofs, such that the correctness proof eliminates a need to communicate with other computing nodes for validating the computational values generated by the second set of computing nodes; and validating the correctness proof of each of the computational value to establish a consensus related to the computational values using each of a third set of computing nodes from the plurality of computing nodes, wherein the third set of computing nodes is configured to validate the correctness proof using a verification algorithm that uses the verification key, the computational value and the correctness proof and provides output as either accept or reject, wherein the accept output represents a validation of the computational value and the reject output represents an invalidation of the computational value, thereby establishing consensus such that a time required for validation is reduced, and such that a use of unsafe communication channels is eliminated due to the non-interactivity of the plurality of computing nodes, and a temporal responsiveness of the computation system is increased when executing various data processing tasks.

7. The method of claim 6, wherein the plurality of computing nodes is configured to participate in an interactive distributed key generation wherein each of the plurality of computing nodes is configured to interact with the other computing nodes using a confidential and authenticated communication channel.

8. The method of claim 6, wherein the method comprises generating the partial evaluation of the computational task using a partial evaluation algorithm, wherein the partial evaluation algorithm is a partial pseudorandom function computation, wherein given a plaintext input x, the method comprises the pseudorandom function utilizing a cryptographically secure elliptic curve and a non-interactive zero-knowledge proof system to test the correctness of the partial computation of pseudo-random values provided by computing nodes without revealing the information itself or any additional information.

9. The method of claim 6, wherein the method comprises implementing the protocol variant of the distributed computation system as a distributed signature scheme by generating a public signing key to validate consensus, comprising a partial signing algorithm, typically run or implemented by the computing node and a signature recovery algorithm used to compute a compute a complete signature from a list of partial signatures.

10. The method of claim 6, wherein the method comprises verifying a list of partial signatures by implementing a global signature verification algorithm using the third set of computing nodes.

11. A computer program product comprising a non-transitory computer-readable storage medium having computer-readable instructions stored thereon, the computer-readable instructions being executable by a computerized device comprising processing hardware to execute a method as claimed in claim 6.

* * * * *